US011144429B2

(12) United States Patent
Chakra et al.

(10) Patent No.: US 11,144,429 B2
(45) Date of Patent: Oct. 12, 2021

(54) DETECTING AND PREDICTING APPLICATION PERFORMANCE

(71) Applicant: International Business Machines Corporation, Armonk, NY (US)

(72) Inventors: Al Chakra, Apex, NC (US); Tian Ming Pan, Beijing (CN); Peng Fei Tian, Beijing (CN); Chu Yun Tong, Beijing (CN); Fan Zhang, Beijing (CN); Cheng Fang Wang, Beijing (CN); Bo Chen Zhu, Xi'an (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

(21) Appl. No.: 16/550,472

(22) Filed: Aug. 26, 2019

(65) Prior Publication Data

US 2021/0064507 A1    Mar. 4, 2021

(51) Int. Cl.
  *G06F 11/34* (2006.01)
  *G06K 9/62* (2006.01)
  *G06F 8/41* (2018.01)
  *G06N 20/00* (2019.01)

(52) U.S. Cl.
  CPC .......... *G06F 11/3466* (2013.01); *G06F 8/443* (2013.01); *G06F 11/3409* (2013.01); *G06F 11/3447* (2013.01); *G06K 9/6256* (2013.01); *G06F 2201/875* (2013.01); *G06N 20/00* (2019.01)

(58) Field of Classification Search
  None
  See application file for complete search history.

(56) References Cited

U.S. PATENT DOCUMENTS

| | | | |
|---|---|---|---|
| 9,372,685 | B1 | 6/2016 | Luettge et al. |
| 9,715,663 | B2 | 7/2017 | Baldini Soares et al. |
| 10,671,504 | B2 * | 6/2020 | VanBlon ................. G06F 11/00 |
| 2007/0044075 | A1 | 2/2007 | Koning et al. |
| 2013/0311968 | A1 | 11/2013 | Sharma |
| 2015/0317563 | A1 | 11/2015 | Baldini Soares et al. |

(Continued)

OTHER PUBLICATIONS

Mell et al.; "The NIST Definition of Cloud Computing—Recommendations of the National Institute of Standards and Technology"; U.S. Department of Commerce; Sep. 2011; 7 pages.

*Primary Examiner* — Jason D Mitchell
(74) *Attorney, Agent, or Firm* — Cantor Colburn LLP; Teddi Maranzano

(57) ABSTRACT

Aspects of the invention include detecting and predicting application performance. A non-limiting example computer-implemented method includes receiving source code and generating a first model of the source code by labeling a word of the source code. The computer implemented method optimizes the first model of the source code by assembling the first model of the source code with a plurality of models generated by a model generation module into a second model of the source code and extracts at least two basic features from the second model of the source code. The computer-implemented method provides an estimated performance of the source code based on historical data of the basic features extracted from the second model of the source code.

6 Claims, 6 Drawing Sheets

(56) References Cited

U.S. PATENT DOCUMENTS

| | | |
|---|---|---|
| 2015/0339572 A1* | 11/2015 | Achin .................... G06N 5/04 |
| | | 706/46 |
| 2016/0154960 A1 | 6/2016 | Sharma et al. |
| 2016/0170747 A1 | 6/2016 | Luettge et al. |
| 2018/0150742 A1* | 5/2018 | Woulfe ................. G06N 20/00 |
| 2019/0138731 A1* | 5/2019 | Tan .................... G06F 11/3608 |
| 2019/0220778 A1* | 7/2019 | Murano ................ G06N 5/025 |
| 2019/0227902 A1* | 7/2019 | Cheng ..................... G06F 8/71 |
| 2019/0347093 A1* | 11/2019 | Challagolla ......... G06F 11/3612 |
| 2020/0026577 A1* | 1/2020 | Dias ......................... G06F 8/75 |

* cited by examiner

DETECTING AND PREDICTING APPLICATION PERFORMANCE

BACKGROUND

The present invention generally relates to software editing, and more specifically, to detecting and predicting application performance.

Applicant development and deployment often require a series of upgrades. Upgrading a running application is fraught with difficulties and pitfalls. One such pitfall is not knowing the true impact on performance of an application upgrade, as upgrades may significantly degrade performance and there is no way to know the actual performance hit until an upgrade has been deployed.

SUMMARY

Embodiments of the present invention are directed to detecting and predicting application performance. A non-limiting example computer-implemented method includes receiving source code and generating a first model of the source code by labeling a word of the source code. The computer implemented method optimizes the first model of the source code by assembling the first model of the source code with a plurality of models generated by a model generation module into a second model of the source code and extracts at least two basic features from the second model of the source code. The computer-implemented method provides an estimated performance of the source code based on historical data of the basic features extracted from the second model of the source code.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention can be utilized to extract features from source code changes, and to build a model based on the features and performance indicators to predict a performance impact of the source code changes. One or more embodiments of the present invention include two models: a first model that is trained to extract features from the source code; and a second model that predicts the performance impact based on the features from the first model and performance indicators.

Following an application upgrade in a production system, performance of systems is often impacted. Performance data is collected after an application is put into production, and that performance data can be worse than expected. It is difficult for testing software to provide a testing result which is good enough to find all of the performance issues which can surface in the production system. It has not been possible to find all potential performance issues based on the current methods of testing and code review. It is also difficult for customers to find potential performance issues and fix them before they may cause an outage or performance degradation of the production system.

One or more embodiments of the present invention address one or more of the above-described shortcomings of the prior art by providing an enhanced method to extract features from source code changes, and to build a model based on the features and performance indicators to predict performance impact. Existing systems fail to predict performance impact as they only do not use performance indicators in their systems. In addition, prior systems often perform no modeling at all, and performance hits are not seen until source code changes are put into effect.

One or more embodiments of the present invention include a method that analyzes and predicts performance of certain indicators based on changes to an application's source code. The method extracts features from the source code and summarizes and evaluates the changes to the source code. Over time, the model improves its accuracy through training using summarized features and performance indicator values.

Figure 1:
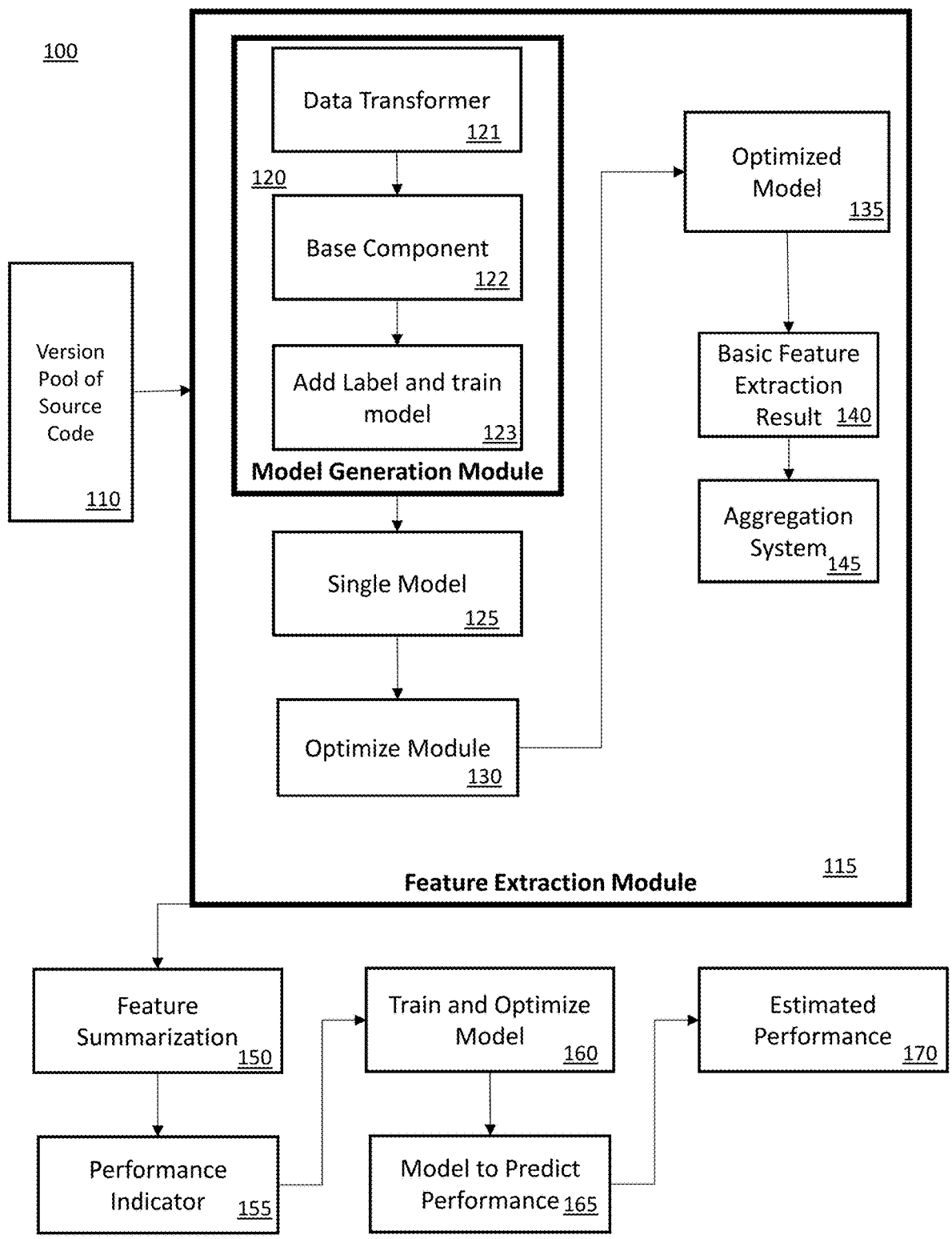
FIG. 1 illustrates a flow diagram of a process for detecting and predicting application performance in accordance with one or more embodiments of the present invention.

Turning now to FIG. 1, a flow diagram of a process for detecting and predicting application performance in accordance with one or more embodiments of the present invention is shown. A version pool of source code 110 contains source code to be tested that will be input to Feature Extraction Module 115. A Model Generation Module 120 extracts the source code into base components (blocks 121 and 122) using a characteristic function. Base components are shown in more detail with respect to table 220 in FIG. 2 which follows. Labels are added to each base component, where the labels could be "condition," "feature," or "ignore." (block 123). Examples of these labels will be shown with respect to FIG. 2 and expounded upon at that point.

A single model (block 125) is generated which is trained via the base component and label. The single model assists a user in reading the source code as input and the outputting the features and their respective labels. The single model (block 125) is provided to an Optimize Module 130 which assembles the single model with multiple models generated by the Model Generation Module 120 in order to improve the accuracy of the Feature Extraction Module 115. There are several models and the weight of the models is adjusted based on the prediction results of previous models. An optimized model 135 is thus generated.

Following generation of the optimized model 135, the optimized model 135 is read for added and/or deleted source code and output features with labels. (block 140). An Aggregation System 145 summarizes the numbers of each kind of feature to generate a Summarization of Features 150.

Based on historical data, the value of one specified performance indicator is assigned to a corresponding summarized feature that is generated by that version of source code as the label. (block 155). This second model is trained based on the summarized features and the value of performance indicators. (block 160). This generates a new model 165.

When there are new code changes, the code is input to the first model to become summarized features 150. The summarized features 150 are input into the second model. The second model predicts the value of this performance indicator that is what a user uses to evaluate the performance impact of the change in the source code. (block 170). The second model is different for each type of performance indicator. For example, response time and CPU time may be used as performance indicators, thus causing the training of two models respectively for the second model. The first model would be shared by both performance indicators.

The Model Generation Module 120 is now described in more detail. Unstructured data from the source code is transferred to feature/label pairs. Then, a model is trained based on those basic components. The model will be used to split the source code into features in further downstream processing. A data transformer is used to split the source code into pieces with, in an exemplary embodiment, three words in each one. Those skilled in the art after reading this disclosure will appreciate that source code could be split into pieces of size other than three words. A characteristic function to generate the initial probability distribution of each feature is described below:

$$f(x, y) = \begin{cases} 2, & \text{if } x = \text{'IF' or 'ELSE' and } y = \text{'condition'} \\ 1, & \text{if } x = \text{'MOVE' or other keyword and } y = \text{'feature'} \\ 0, & \text{Else and } y = \text{'ignore'} \end{cases}$$

There is a characteristic function for each kind of feature. Calculate the empirical distribution of joint distributions and empirical distribution of joint distributions of each kind of feature:

$$\tilde{P}(X=x, Y=y) = (\text{count}(X=x, Y=y))/(\text{Total number of features})$$

$$\tilde{P}(X=x) = (\text{count}(X=x))/(\text{Total number of features})$$

The mathematical expectation of characteristic function about the probability distribution is as follows:

$$E_{\tilde{P}}(f) = \Sigma_{x,y} \tilde{P}(x, y) f(x, y) = \frac{1}{\text{total number of features}} \Sigma_{x,y} f(x, y)$$

The model will generate the probability of P(Y|X), if the probability is high, then one can say it is a boundary and can be used to split into 2 features. The mathematical expectation of model P(Y|X) about characteristic function is:

$$E_P(f) = \sum_{x,y} P(x, y) f(x, y) \approx \sum_{x,y} \tilde{P}(x) P(y|x) f(x, y)$$

Here condition which the model needs to meet when building the model is:

$$E_{\tilde{P}}(f) = E_P(f)$$

Then for all the characteristic function, a full collection of the model that meets the condition mentioned above is calculated:

$$C = \{P | E_{\tilde{P}}(f_i) = E_P(f_i), i=1,2,\ldots,n\}$$

The entropy of model P(Y|X) is as follows:

$$H(P) = -\Sigma_{x,y} P(y, x) \log P(y|x) = -\Sigma_{x,y} \tilde{P}(x) P(y|x) \log P(y|x)$$

The purpose of the model is to find a pair of features and labels which meet the condition in C and also makes a maximum value of H(P).

The Optimization Module 130 is further described here. When the system receives a single model, it will work well. The system uses a combination of the predictors which are generated by the Model Generation Module 120 to achieve a better model.

Assume that for each kind of training instance, the initial weight of each one is as follows:

$$w^j = \frac{1}{m} (m \text{ is the number of instances})$$

Then for the $j^{th}$ model, the weighted error can be calculated as follows:

$$r_j = \frac{\sum_{i=1}^{m} w^j_{(\hat{y}^i \neq y^i)}}{\sum_{i=1}^{m} w^j}$$

where $\hat{y}^i$ is the predicted result while $y^i$ is the actual value. The weight of each model is calculated as follows:

$$\alpha^j = \beta * \log \frac{1 - r_j}{r_j}$$

where β is the learning rate of the model.

The next step is to update the weight $w^i$ based on the prediction result of the previous model using the following method:

for $i = 1, 2, \ldots m$ $$w^i = \begin{cases} w^i \text{ if } \hat{y}^i = y^i \\ w^i \exp(\alpha_j) \text{ if } \hat{y}^i \neq y^i \end{cases}$$

The model followed by the previous one would update the weight of instances based on the prediction result of the previous model. The system generates the final prediction result based on the joint prediction result of all the models:

$\hat{y}^i(x) = \max(\Sigma_{j=1}^{N} \alpha_j)$ for $\hat{y}_j(x) = k$

Where N is the total number of models and k is the predicted value.

Figure 2:
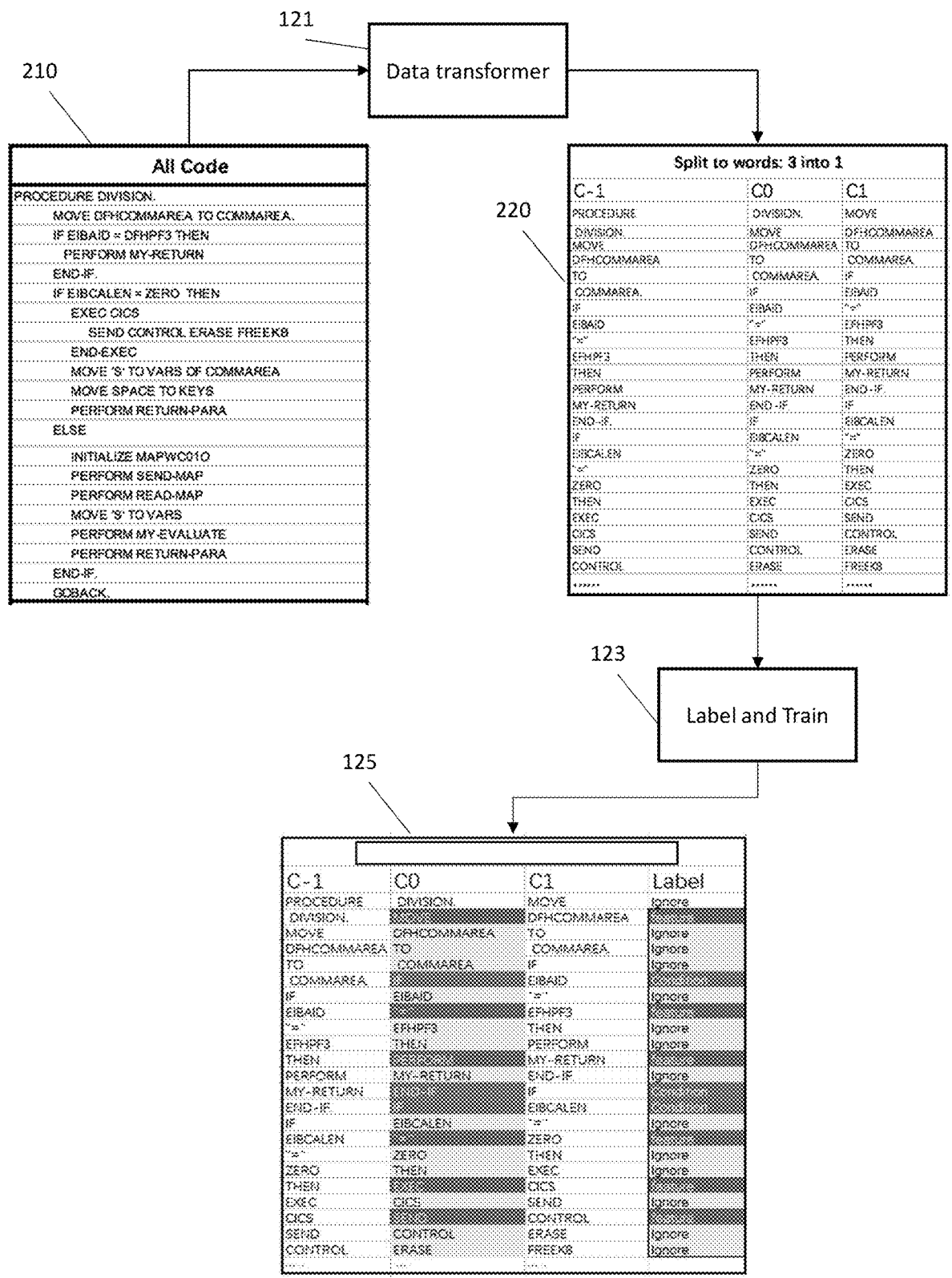
FIG. 2 illustrates an example flow of a process for detecting and predicting application performance in accordance with one or more embodiments of the present invention.

FIG. 2 illustrates an example flow of a process for detecting and predicting application performance in accordance with one or more embodiments of the present invention. Source code 210 from Version Pool of Source Code 110 is retrieved by the Model Generation Module 120. The data transformer 121 and base component 122 transforms the source code into words in 3 columns 220 or into base components. Label and Train module 123 then labels each word into a Single Model 125.

Figure 3:
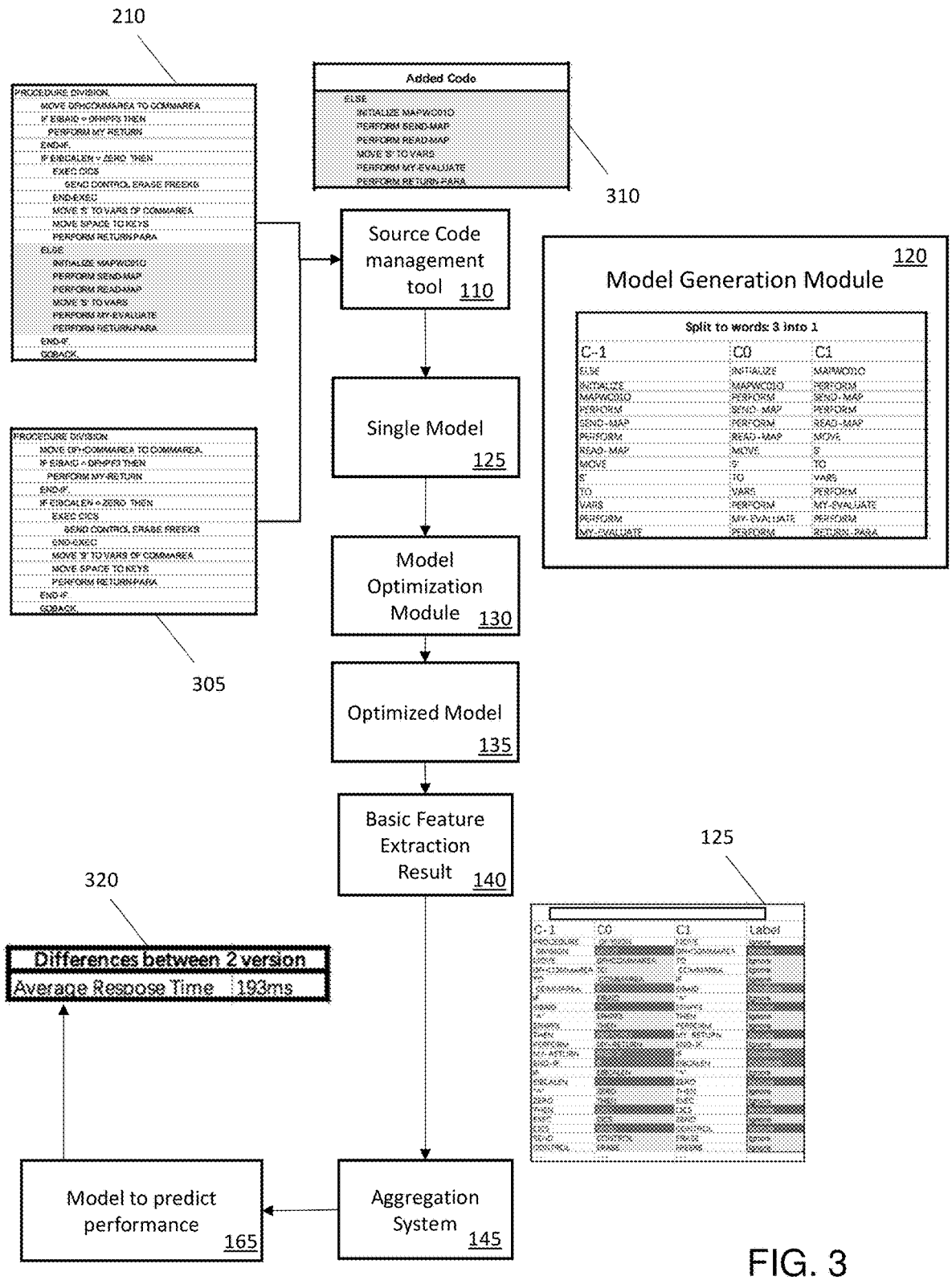
FIG. 3 illustrates an example flow of a process for detecting and predicting application performance in accordance with one or more embodiments of the present invention.

FIG. 3 illustrates an example flow of a process for detecting and predicting application performance in accordance with one or more embodiments of the present invention. Source code 305 is the existing source code, and source code 210 is the revised source code. The added code 310 is input from the source code management tool 110 to generate a single model 120 by single model module 125. As previously described, the single model is optimized by Model Optimization Module 130 to generate Optimized Model 135 prior to feature extraction 140. Feature extraction 140 yields the labeled second model 125. The Aggregation System 145 generates a model to predict performance 165 which then yields a difference in execution time 320 between the old version and the new version. Based on historical data, the value of one specified performance indicator is assigned to a corresponding summarized feature that is generated by that version of source code as the label. This value is used to measure performance.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
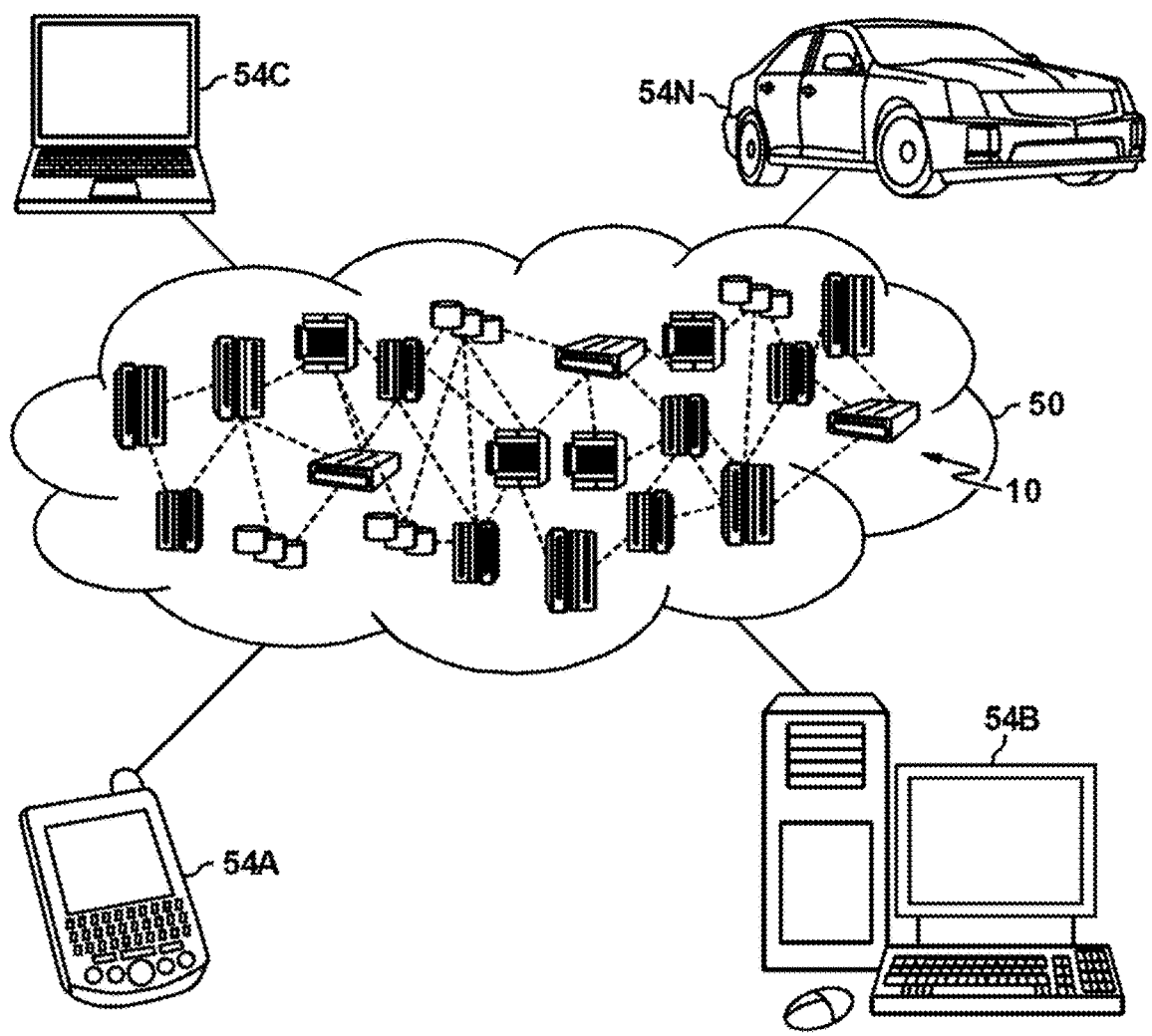
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
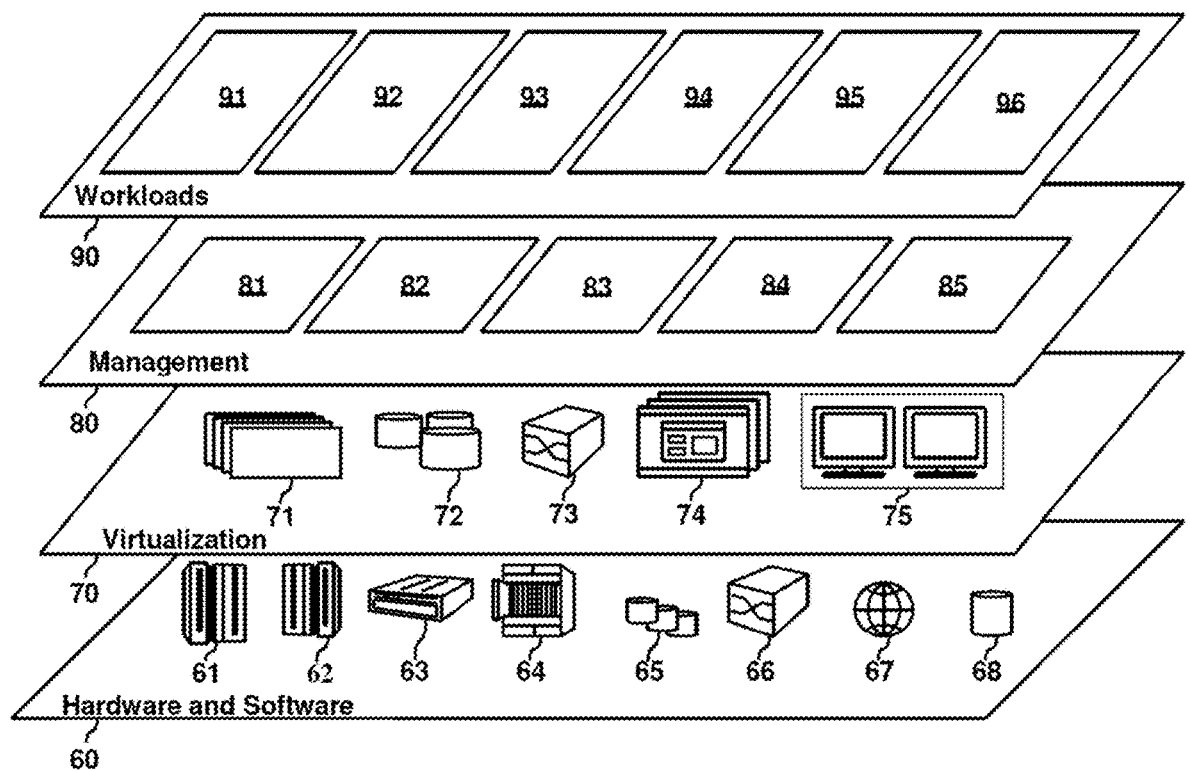
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application performance prediction processing 96

Figure 6:
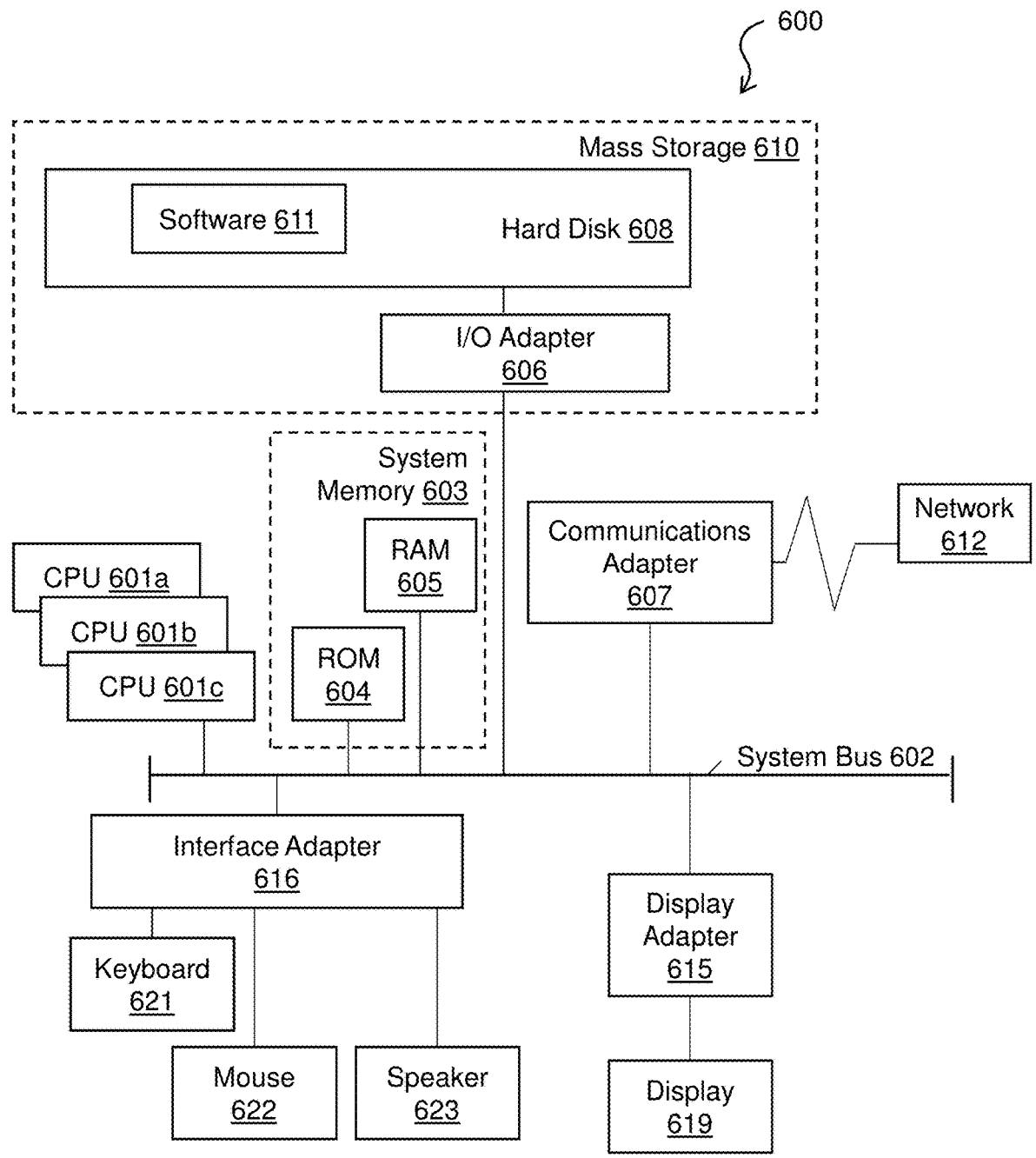
FIG. 6 depicts a computer system in accordance with one or more embodiments of the present invention.

Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the Internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving a current source code and a revised source code comprising new code;
   splitting the new code into segments comprising three words;
   creating a set of summarized features by labeling, using a first machine learning model, each segment as a feature, a condition or an ignored segment based on a value of the second word in the respective segment, wherein the values associated with moving, performing, executing, determining equalities, and sending are labeled as features, wherein values associated with if, end-if, and else statements are labeled as conditions, and wherein all other values are labeled as ignored segments;
   assigning a performance indicator type to each summarized feature of the first machine learning model, the performance indicator type comprising one of a response time and a CPU time;
   determining, using a second machine learning model for the assigned performance indicator type and historical data, a value of the performance indicator assigned to each respective summarized feature; and
   providing an estimated performance impact of the new code of the revised source code based on the value of the performance indicator.

2. The computer-implemented method of claim 1 wherein generating the first model comprises training the first model to extract features from source code.

3. A system comprising:
   a memory having computer readable instructions; and
   one or more processors for executing the computer readable instructions, the computer readable instructions controlling the one or more processors to perform operations comprising:
      receiving a current source code and a revised source code comprising new code;
      splitting the new code into segments comprising three words;
      creating a set of summarized features by labeling, using a first machine learning model, each segment as a feature, a condition, or an ignored segment based on a value of the second word in the respective segment, wherein values associated with moving, performing, executing, determining equalities, and sending are labeled as features, wherein values associated with if, end-if, and else statements are labeled as conditions, and wherein all other values are labeled as ignored segments;
      assigning a performance indicator type to each summarized feature of the first machine learning model, the performance indicator type comprising one of a response time and a CPU time;
      determining, using a second machine learning model for the assigned performance indicator type and historical data, a value of the performance indicator assigned to each respective summarized feature; and
      providing an estimated performance impact of the new code of the revised source code based on the value of the performance indicator.

4. The system of claim 3 wherein generating the first model comprises training the first model to extract features from source code.

5. A computer program product comprising a computer readable storage medium having program instructions embodied therewith, the program instructions executable by a processor to cause the processor to perform operations comprising:
   receiving a current source code and a revised source code comprising new code;
   splitting the new code into segments comprising three words;
   creating a set of summarized features by labeling, using a first machine learning model, each segment as a feature, a condition, or an ignored segment based on a value of the second word in the respective segment, wherein values associated with moving, performing, executing, determining equalities, and sending are labeled as features, wherein values associated with if, end-if, and else statements are labeled as conditions, and wherein all other values are labeled as ignored segments;
   assigning a performance indicator type to each summarized feature of the first machine learning model, the performance indicator type comprising one of a response time and a CPU time;
   determining, using a second machine learning model for the assigned performance indicator type and historical data, a value of the performance indicator assigned to each respective summarized feature; and
   providing an estimated performance impact of the new code of the revised source code based on the value of the performance indicator.

6. The computer program product of claim 5 wherein generating the first model comprises training the first model to extract features from source code.

\* \* \* \* \*